United States Patent
Casteleiro et al.

(10) Patent No.: US 6,560,050 B2
(45) Date of Patent: May 6, 2003

(54) OPTICAL SEGMENTED RF SIGNATURE MANAGED WINDOW

(75) Inventors: Carlos Anselmo Casteleiro, Altamonte Springs, FL (US); David J. Falabella, Merritt Island, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/878,348

(22) Filed: Jun. 12, 2001

(65) Prior Publication Data

US 2002/0186484 A1 Dec. 12, 2002

(51) Int. Cl.[7] ............................................. G02B 27/00
(52) U.S. Cl. ...................... 359/894; 359/350; 428/209; 250/353
(58) Field of Search ..................... 359/350, 894; 428/209; 250/353

(56) References Cited

U.S. PATENT DOCUMENTS

| | | | |
|---|---|---|---|
| 4,932,755 A | | 6/1990 | Holdridge et al. |
| 5,017,419 A | * | 5/1991 | Smith .................. 428/209 |
| 5,266,790 A | | 11/1993 | Markle et al. |
| 5,573,824 A | | 11/1996 | Klocek et al. |
| 5,629,074 A | | 5/1997 | Klocek et al. |
| 5,973,827 A | | 10/1999 | Chipper |
| 6,346,705 B1 | | 2/2002 | Lee et al. |

OTHER PUBLICATIONS

Fulghum, David A., "Stealth Is Still Hot JSF Topic." Aviation Week and Space Technology, New York: McGraw–Hill, Apr. 23, 2001, pp. 45–46.

* cited by examiner

*Primary Examiner*—Audrey Chang
*Assistant Examiner*—Craig Curtis
(74) *Attorney, Agent, or Firm*—Burns, Doane, Swecker & Mathis, LLP

(57) ABSTRACT

A window has at least two surfaces oriented relative to each other at an angle greater than zero. A conductive path is disposed across the two surfaces and renders the window reflective or absorptive to a second predetermined bandwidth of energy, which can be radio frequency energy. The window utilizes window geometry, surface treatments, and bonding techniques to maintain electrical continuity across the surface. The window can be constructed from multiple segmented elements, such as sapphire, or from a unitary body. The window is transmissive to a desired wavelength of energy for the sensor while being reflective, refractive, or absorptive to a desired RF bandwidth of energy. The window provides RF signature management coupled with a substantial sensor Field of Regard and allows for full-time use of an embedded sensor.

20 Claims, 4 Drawing Sheets

OPTICAL SEGMENTED RF SIGNATURE MANAGED WINDOW

BACKGROUND

1. Field of the Invention

The present invention is directed generally to a window. More specifically, the present invention is directed to a window over a sensor which provides radio frequency signature management (stealth) capabilities while maintaining field of regard for the sensor.

2. Background Information

Platforms outfitted with sensors require windows and external surfaces to house, allow transmission and reception, and protect sensors. Such windows can be covered apertures through which a desired frequency or wavelength of energy is transmitted or received or can be openings in the external covering of the platform.

It has become desirable to build and equip platforms which have a minimum radar or radio frequency signature. This characteristic, also called stealth technology, has been utilized, for example, by the military in an attempt to minimize the detection of aircraft. In a typical radar or radio frequency interaction, the transmitted RF energy intercepts and reflects off surfaces of a platform, returning to a receiver which senses and translates the return signal to an operator and indicates that the platform has been detected. Typical radars can operate in the submicron to millimeter wave range.

Radio frequency signature management (RFSM), or stealth technologies, attempt to minimize the radio frequency energy interaction with the platform. In one example, the angularity and the materials selected for such applications either reflect, refract or absorb the radio frequency energy, thus minimizing or substantially preventing a return signal to the receiver.

Although the application of radio frequency signature management systems to platforms have been successful, the application of radio frequency signature management systems to components of the platform, such as the windows over sensors, have produced more limited successes. For example, prior windows have been of planar or single pane design. Such windows have been positioned conformally to the body of the platform. The materials of the sensor window are not typically adequate to manage the radio frequency signature without enhancements. An overlay material has been disposed over the surface of the conformal window to provide radio frequency and energy management.

However, the use of conformal windows adversely impacts the performance of the sensor utilizing the window, such as the field of regard. Field of regard (FOR) refers to the search volume available to the sensor. Field of Regard is different from Field of View (FOV), which refers to the angle subtended by the optical elements of a sensor. Limiting the Field of Regard deleteriously impacts the performance of the sensor by limiting the search volume, and limiting the tactical and situational usefulness of the sensor. For example, a limited Field of Regard can result in the inability to maintain continuous searching and tracking of a desired target.

Therefore, it is desirable to have a window for a sensor mounted on a platform which provides the required radio frequency signature management and aerodynamic performance while also providing an expanded field of regard.

SUMMARY OF THE INVENTION

A window has at least two surfaces oriented relative to each other at an angle greater than zero. The surfaces meet at an edge and are transparent to at least a first predetermined bandwidth of energy, such as a wavelength of the platform's sensor. A conductive path is disposed across the two surfaces and renders the window reflective or absorptive to a second predetermined bandwidth of energy, which can be radio frequency energy.

The window signature to the predetermined bandwidth of energy is a function of the angle formed by the intersection of the at least two planar surfaces and the line of the angle.

The window can be a plurality of segmented panes or a unitary body. Suitable materials for the window are IR transmissive and include sapphire or chalcogenide glass.

The window provides a conductive path that is in electrical contact with the host platform. The conductive path can be gold, platinum, titanium, a noble metal, or a material that is impedance matched to a host platform. The conductive path can be deposited on the surface using any suitable technique, such as by electrodeposition, electrodeless deposition, physical vapor deposition techniques, or chemical vapor deposition techniques. In an exemplary embodiment, the conductive path is a single or overlaying grid pattern of shapes, the sizes of which are chosen to obtain a desired sheet resistivity.

A method to form a window is also provided. A plurality of segments are faceted with a desired mitered edge and a conductive surface treatment is deposited on a first surface. The segments are joined by a structural adhesive and a conductive adhesive to form a surface, as delineated by the first surfaces of each of the segments. A conductive connector at the joint of the segments of the surface establishes electrical continuity between the host platform and the conductive surface treatment of each of the segments, thereby providing an electrical signature of the window that is impedance matched to the electrical signature of the host platform.

BRIEF DESCRIPTION OF THE DRAWING FIGURES

Other objects and advantages of the invention will become apparent from the following detailed description of preferred embodiments in connection with the accompanying drawings in which like numerals designate like elements and in which.

DETAILED DESCRIPTION OF THE PREFERRED EMBODIMENTS

Figure 1:
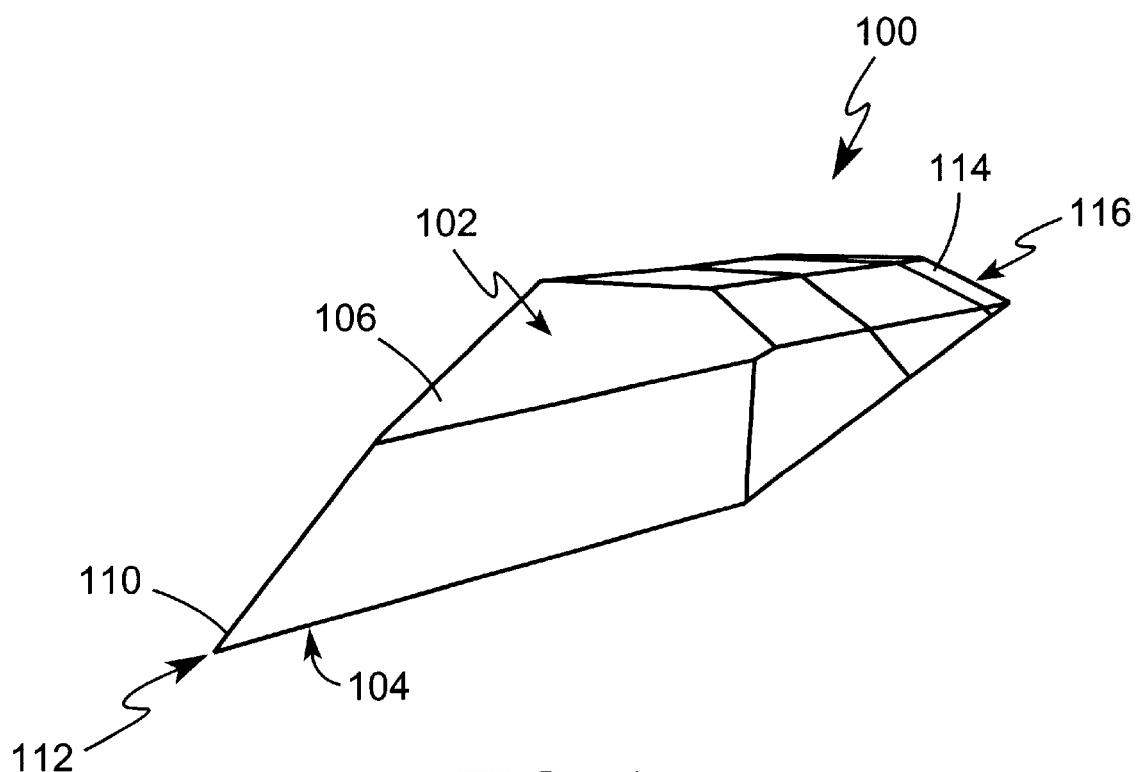
FIG. 1 is a perspective view of an exemplary window.

FIG. 1 is a perspective view of a window. At least two surfaces are oriented relative to each other at an angle greater than 0°. The surfaces meet at an edge to form a first surface that is non-conformal to the surface of the platform on which it is mounted. The first surface, which when mounted on the platform is exposed to the environment, has a conductive path deposited substantially across its surface area. The window geometry and the conductive paths provide RF energy signature management (RFSM) resulting in a low RF energy cross section.

The window 100 in the exemplary embodiment has a first surface 102, and a second surface 104. A flat surface 106, substantially a table, is provided at the thickest portion of the window 100 and is substantially parallel to the second surface 104 over its area. A first leading edge 110 is located at the proximal end 112 of the window 100, substantially along the centerline, and provides an aerodynamic or similar function. A trailing edge 114 is provided at a distal end 116 of the window 100 and has a shallow sloped surface covering substantially the distal ⅓ of the first surface 102.

Figure 2:
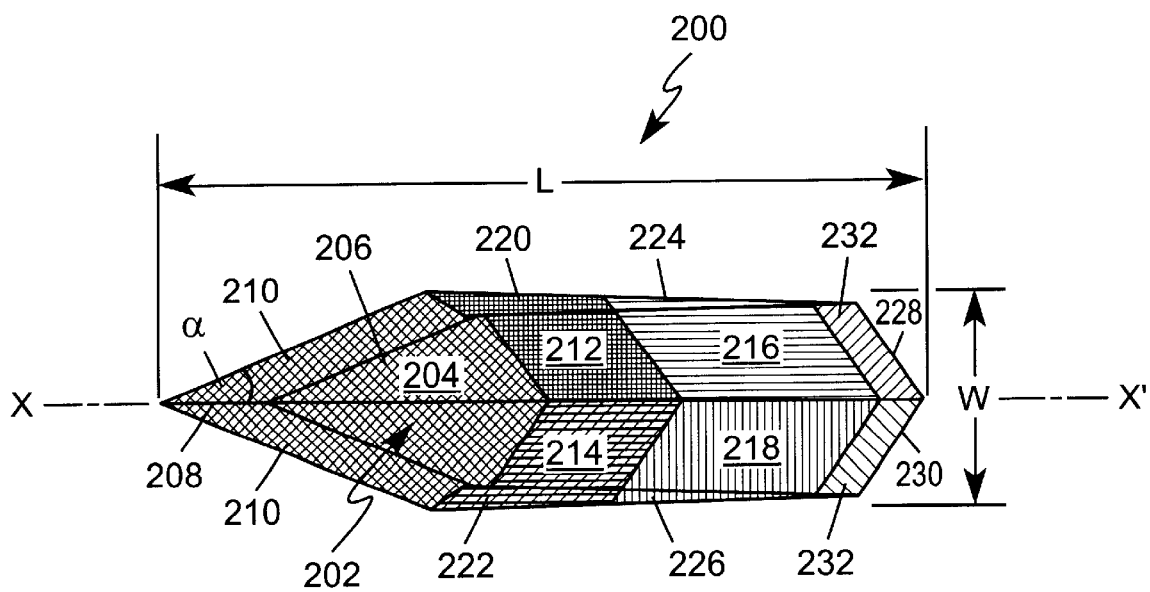
FIG. 2 is a top view of an exemplary window.

FIG. 2 is a top view of the first surface 202 of the window 200. In the exemplary embodiment shown, the window 200 has seven segments that are mitered-edged, sapphire elements joined together at the edges.

To practice a window, seven segments are not required. Any combination of segments can be used that combine to produce the desired angles of the panes and the angles of the edges of the window. The angles of panes and edges that define the window are manufactured and assembled so as to provide acceptable reduction in the return of a desired bandwidth of energy of a threat radar, such as RF energy, in azimuth and elevation and improved Field of Regard.

For example, in aerodynamic applications, air flow and turbulence can deleteriously impact radar signature of an otherwise low radar cross section. The mitered angles of the window reduce airflow turbulence, as compared to deployable pod/turret designs, and reduce the return of potential threat radars. For RF energy, the reduction can be greater than 250%.

A window in keeping with the invention results in reduced obscuration of the FOR. In the exemplary embodiment, the FOR is approximately 140° to either side of centerline looking toward the leading edge. Additionally, the window allows a gimbaled sensor to be positioned in a cavity on the platform and to perform with multiple degrees of freedom, The gimbal's performance and rotation can be accommodated within a margin allowing for sway space arising from the motion of the platform.

In the exemplary embodiment shown in FIG. 2, the window 200 has a length L of 47 inches and a width W of 13.60 inches. A proximal segment 204 has a table 206 and a first leading edge 208 with a leading edge pane 210 to each side of the longitudinal axis X–X'. The longitudinal axis X–X' and each leading edge pane 210 meet at the first leading edge 208 to form a leading edge pane angle of approximately 22.78°. Adjacent to the proximal segment 204 along the longitudinal axis X–X' is an arrangement of four segments 212, 214, 216, 218 each with an intermediate edge pane 220, 222, 224, 226, respectfully. Two distal segments 228, 230 have a trailing surface 232. The trailing surface 232 joins corresponding surfaces of the intermediate segments 212, 214, 216, 218. The perimeter of the first surface 202 of the window 200 from the first leading edge 208 to the distal segments 228,230 (that is, encompassing the leading edge pane 210 and the intermediate edge panes 212, 214, 216, 218 and sweeping into the distal segments 228,230) has an edge pane angle Δ of approximately 20.26°.

Figure 3:
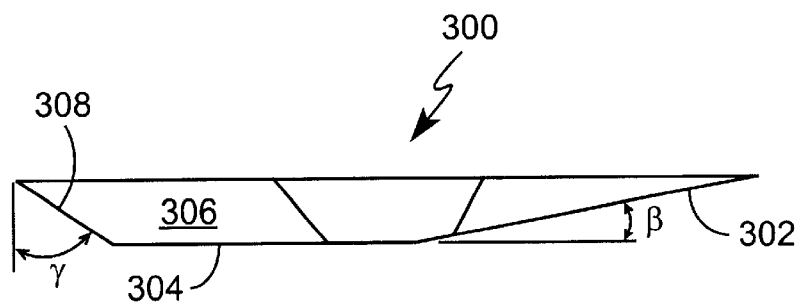
FIG. 3 is an edge view of an exemplary window.

FIG. 3 shows a side elevation of the window 300 of the exemplary embodiment. The trailing surface 302 forms a trailing angle β of approximately 11° with the table 304 of the proximal segment 306. The four intermediate segments have an angle on their respective intermediate surfaces corresponding to the trailing angle β. The first leading edge 308 forms a first leading edge angle γ of approximately 31.67°, measured from the perpendicular.

Figure 4:
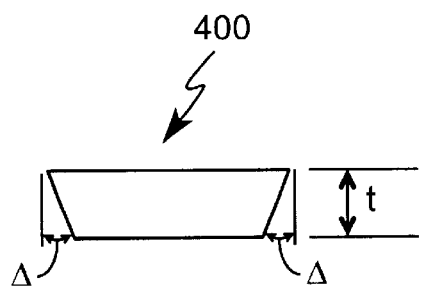
FIG. 4 is an additional edge view of an exemplary window.

FIG. 4 is an additional side elevation of the window 400 showing the mitered panes on the perimeter and the edge pane angle Δ. The thickness t of the window 400 of the exemplary embodiment is approximately 3.89 inches.

All the length dimensions described herein have a tolerance of approximately ±5 mils and the angles have a tolerance of approximately ±0.02°.

Figure 5:
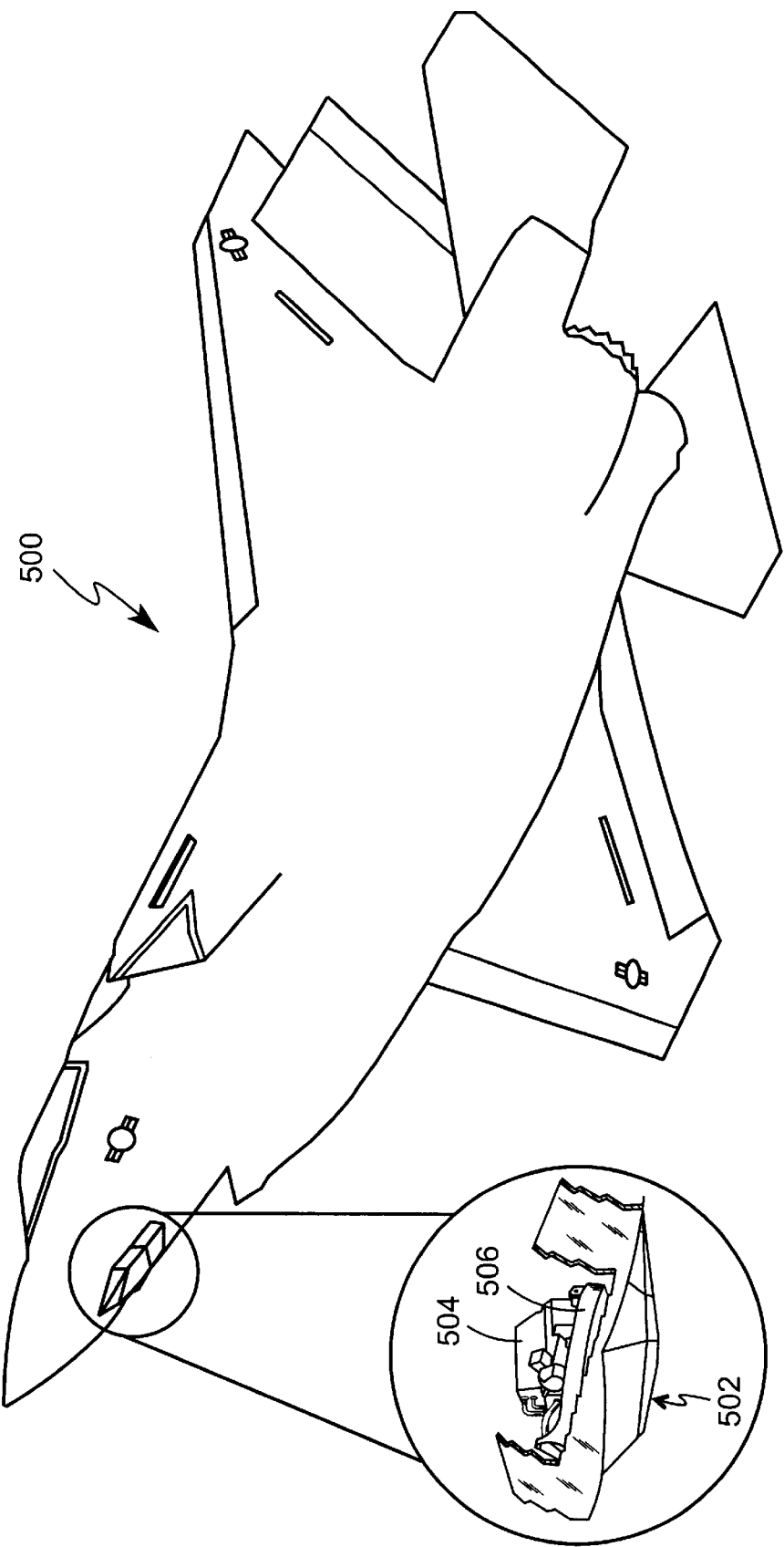
FIG. 5 is the underside view of an exemplary host platform with an exemplary window mounted on its surface.

Geometrically, the angles of the panes and the angles of the edges that comprise the window are tailored to substantially coincide with structural features on the host platform. For example, on an aircraft, the panes of the window can make an angle with the aircraft fuselage that is geometrically similar to the prominent aircraft features, such as the sweep and orientation of the wings. FIG. 5 shows a host platform 500, an aircraft, with a window 502 mounted on the underside of the fuselage. The window 502 can be mounted to mate to the host platform 500. Alternatively, a transition element (not shown) can be used. FIG. 5 also depicts a gimbaled sensor 504 mounted behind the window on a host platform 506. For use in aircraft applications, a window as depicted in the exemplary embodiments and with the mitered edges given can be provided.

Additionally, the internal mitered edges and panes of a multi-segmented window are a function of each application. Different applications can require different mitered edges and angles. In general, changing any one angle on a mitered edge will impact all of the other mitered edges. However, as a mitered edge is joined to a second mitered edge, changes in any angle can be offset by a change in the complementary or supplementary angle of the segments.

The window has surface treatments that provide electrical characteristics that match the host platform. A first surface treatment is deposited on the first surface. A second surface treatment is placed on an opposite surface closer to the sensor. The surface treatment has a grid of elements that can be random or form a pattern.

Figure 6:
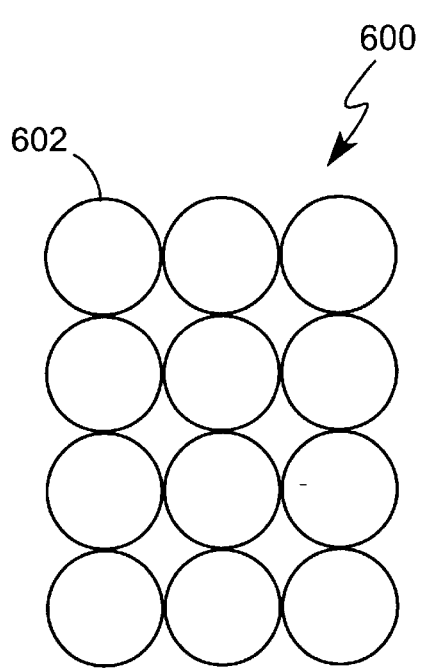
FIG. 6 is a first embodiment of a surface treatment.
Figure 7:
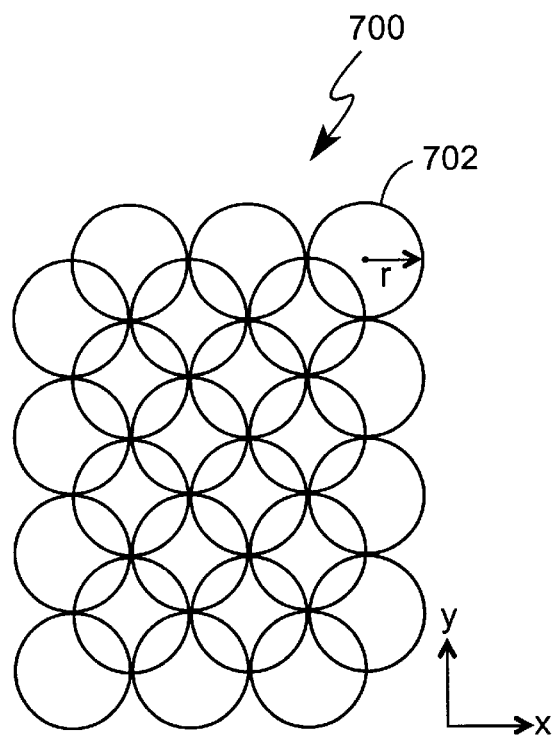
FIG. 7 is an additional embodiment of a surface treatment.

FIG. 6 depicts a first embodiment of a surface treatment 600 for the window. In the embodiment shown, a grid of rings 602 tangentially touch at the cardinal coordinates. FIG. 7 depicts an alternative embodiment of a surface treatment 700. A shift pattern is depicted in which a grid of multiple adjacent rings 702 touch tangentially at the cardinal coordinates, with an overlaying second grid of adjacent rings 704 offset by a radius distance r in the longitudinal direction x and a radius distance r in the lateral direction y. The surface treatments change the electrical characteristics. In the embodiment in FIGS. 6 and 7, the window without a surface treatment has an initial sheet resistivity of 0.25 Ω/sq.; after treatment, the sheet resistivity is 10 Ω/sq. and is 5 Ω/sq., respectively.

Alternative grid patterns can be utilized for the surface treatment. For example, any geometric shape can be used, not just a circle. Additionally, the shape can be sized to achieve the required electrical match between the host platform and the window. For example, the shape can be as small as that required to propagate the wavelength or as large as that to obtain the desired sheet resistivity. In the alternative embodiment with a second grid pattern overlaying the first, the geometry, size, and position of the individual grids can be chosen independently (that is, rings and squares can be combined, varying sizes can be used, and so forth).

The spectrum of resistivities achievable by use of grid patterns with elements varying from the minimum to the maximum size can provide sheet resistivities that can be tuned to the particular wavelength to be managed by the window. For example, the grid can be randomized with radii of 10 $\mu$m to 30 $\mu$m. This type of surface treatment can be utilized in a broadband environment. Alternatively, the surface treatment can be tuned to a radar frequency such as 10 mm or any other desired frequency.

Figure 8:
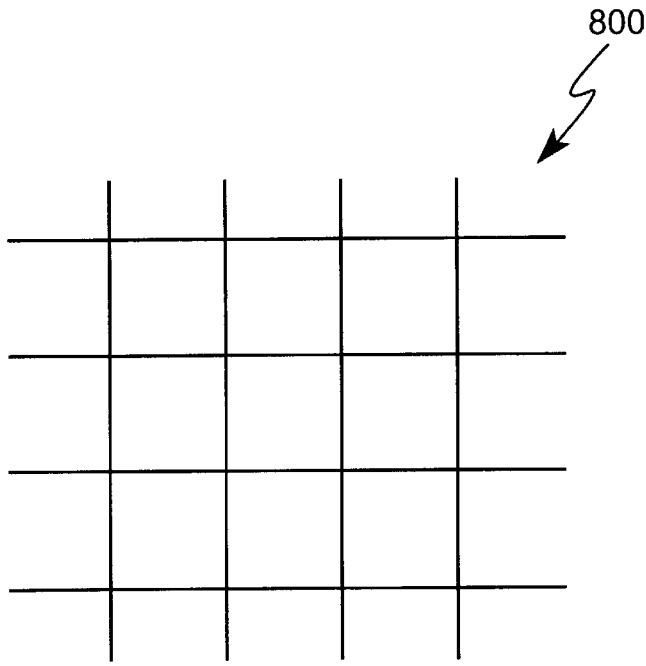
FIG. 8 is a further embodiment of a surface treatment.

FIG. 8 shows a surface treatment 800 for the second surface of the window. The surface treatment 800 for the second surface can be electrically conductive. However, while it is electrically conductive, it is not in electrical contact with the host platform. In the embodiment shown, a grid pattern having 700 $\mu$m line spacing and a 15 $\mu$m line width is depicted. The initial sheet resistivity is 4 $\Omega$/sq. and the surface treatment results in a resistivity of 200 $\Omega$/sq. The use of a surface treatment on the second surface can be optional.

Surface treatments can be deposited on the surfaces of the window by any desired method. In the exemplary embodiments shown, the surface treatments are electrodeposited gold. Alternative methods can include etching, electrodeless deposition, physical vapor deposition techniques, and chemical vapor deposition techniques. Suitable materials for use as the surface treatment include gold, platinum, titanium, other noble metals, and other materials that provide impedance matching to the platform.

The surface treatment on the first surface of the window can be electrically interconnected with adjacent window surfaces and the frame of the host platform. In the exemplary embodiment shown, where the window has multiple segments, the first surfaces of each segment are electrically interconnected with the adjacent segments by conductive adhesive and a conductive strip (that is, a buss bar) at the edges of each segment.

In the exemplary embodiment, the mitered edges of the segments meet at an intersection. The intersection does not need to be a sharp edge. For example, the mitered edges can be joined by a bonding process that can provide an edge with a radius or small curvature. In the exemplary embodiment shown, the bonding is provided by the use of two bonding materials.

The first bonding material is a structural adhesive. A urethane epoxy, such as commercially available from Dow Chemical, is placed in the joint between segments to be joined and allowed to cure. The segments can held in place by any suitable means. For example, the segments can be held in place by a cradle-like system or a pressure-applying system, such as a system applying compressive force. The structural adhesive does not occupy all of the depth of the joint, with a portion of each joint remaining unfilled by structural adhesive, particularly near the outer surface.

The second bonding material is a conductive adhesive. A conducting epoxy, such as a silver impregnated epoxy, fills the joint depth after the structural adhesive has been applied. The electrical character of the conductive adhesive is substantially equal to, or has an impedance matched to, that of the platform and maintains the electrical continuity between the conductive surface treatment of each segment of the multi-segmented window, the platform, and any ancillary equipment, such as a mullion.

Additionally, a buss bar can be positioned along the edge and joints. The buss bar overlaps at least a portion of the surface treatment of each segment of the segmented window, provides electrical continuity across the adjacent surfaces of the entire first surface, and provides electrical continuity with the platform. The buss bar in the exemplary embodiment is approximately 100 mils wide. In an exemplary embodiment, the surface treatment on the second surface of the window is electrically isolated from the other segments of a multi-segmented window and from the host platform.

In the environment where the host platform is an aircraft, the mitered angles and pane surfaces of the window can be selected to be coincident with the leading edges of features of the aircraft, for example, the wings, the tails, and any protruding pods. Additionally, the surface treatment of a window in contact with the environment is provided to establish electrical continuity with that of the aircraft. The electrical continuity is also maintained by the particular bonding and the buss bar impedance. Additionally, a leading edge (that is, a titanium wear strip) can be provided as bird strike protection.

In an alternative embodiment, the window can be formed directly as a unitary body from a moldable material transmissive in the desired bandwidth of energy. An example of such a material is "AMTIR-1", a chalcogenide glass available from Amorphous Materials of Richardson, Tex. When formed as a unitary body, the surface treatment can be applied as a single continuous electrical path with the attendant reduction or elimination of bonding and/or the buss bar. Additional alternative embodiments can have a faceted surface.

The window is transparent to at least a first predetermined bandwidth of energy. The conductive path across the surfaces of the segments renders the window reflective to a second predetermined bandwidth of energy, which can be RF energy. The material for the window in the exemplary embodiment is sapphire. However, any suitable material can be selected which allows for the transmission of a desired wavelength of a specific sensor. The conductive path is integral to and provides electrical continuity with the platform. The absence of sharp changes in the impedance character of the platform and the mounted window assists in the RF signature management.

A method to produce a window forms a first surface with angles of the panes and the angles of the edges that manage the RF signature. Segments are prepared with mitered edges and surface treatments. Prior to the application of the surface treatment, the first surface and, optionally, the second surface of the window are prepared smooth with a commercial polish to promote adhesion of the surface treatment. The conductive surface treatment can be deposited by any suitable method, for example, the electrodeposition of gold in a grid pattern. An optional MgF antireflective coating can also be applied.

A method to assemble a window provides both structural integrity and electrical continuity to meet the applicable requirements of the host platform. Bonding of the segments can be conducted in two steps using the two different bonding materials. In the first application, a structural adhesive is provided and is positioned into the mitered edges of the segments. The segments are held in place by any suitable means. For example, the segmented elements can be held in place by a cradle-like system or a pressure-applying system. A second bonding application uses a conductive adhesive and provides the outermost electrical continuity for the window. The mitered edges can have a chamfer with a "dummy shine" to accommodate the application of the buss bar.

Although the present invention has been described in connection with exemplary embodiments thereof, it will be appreciated by those skilled in the art that additions, deletions, modifications, and substitutions not specifically described may be made without departing from the spirit and scope of the invention as defined in the appended claims.

What is claimed is:

1. A faceted window comprising:
   a leading edge;
   a trailing edge;
   at least three segments, each segment joined at a joint to an adjacent segment along a centerline of the faceted window from the leading edge to the trailing edge to form a non-planar faceted first surface and a second surface; and
   a conductive path provided across at least one of the first surface and the second surface,
   wherein the faceted window is transparent to at least a first predetermined bandwidth of energy.

2. The window of claim 1, wherein the segments are made from a material comprising sapphire.

3. The window of claim 1, wherein the window signature to the first predetermined bandwidth of energy is a function of the non-planar surface.

4. The window of claim 1, wherein the conductive path is deposited by electrodeposition, electrodeless deposition, physical vapor deposition techniques, or chemical vapor deposition techniques.

5. The window of claim 1, wherein the conductive path comprises gold, platinum, titanium, a noble metal, or a material that is impedance matched to a host platform.

6. The window of claim 1, wherein the conductive path comprises a grid of multiple adjacent shapes, the shapes contacting adjacent shapes tangentially at a cardinal coordinate.

7. The window of claim 1, wherein the at least three segments are formed on a unitary body.

8. The window of claim 1, wherein the conductive path renders the window reflective to a second predetermined bandwidth of energy.

9. The window of claim 1, wherein the second predetermined bandwidth of energy includes radio frequencies.

10. The window of claim 1, comprising a conductive conductor at the joints between adjacent segments.

11. The window of claim 6, wherein the conductive path further comprises an overlaying second grid of adjacent shapes offset by a first predetermined distance in a longitudinal direction and a second predetermined distance in a lateral direction.

12. The window of claim 6, wherein the shapes are circles, squares, ovals, rectangles, parallepipeds, polygons, or trapezoids.

13. The window of claim 6, wherein the shapes have a minimum size and a maximum size, the minimum size being that required to propagate a wavelength of interest and the maximum size being that to obtain a desired sheet resistivity.

14. The window of claim 7, wherein the window is made from a chalcogenide glass.

15. A method to form a faceted window, comprising the steps of:
   faceting a plurality of segments with a desired mitered edge;
   disposing a conductive surface treatment on a first surface of each of the plurality of segments;
   joining the plurality of segments to form the faceted window, each of the plurality of segments joined at a joint; and
   disposing a conductive connector at the joint of the segments of the faceted window, the conductive connector establishing electrical continuity between a host platform, and the conductive surface treatment of each of the plurality of segments,
   wherein an electrical signature of the window is impedance matched to an electrical signature of the host platform.

16. The method to form a window of claim 15, further comprising:
   surface polishing the first surface of each of the plurality of segments prior to application of the conductive surface.

17. The method to form a window of claim 15, wherein the conductive surface treatment is disposed by electrodeposition, electrodeless deposition, physical vapor deposition techniques, or chemical vapor deposition techniques.

18. The method to form a window of claim 15, wherein the conductive surface treatment comprises a grid of multiple adjacent shapes, the shapes contacting adjacent shapes tangentially at a cardinal coordinate.

19. The method to form a window of claim 18, wherein the conductive surface treatment comprises gold, platinum, titanium, a noble metal, or a material that is impedance matched to the host platform.

20. The method to form a window of claim 18, wherein the conductive surface treatment further comprises an overlaying second grid of adjacent shapes offset by a first predetermined distance in a longitudinal direction and a second predetermined distance in a lateral direction.

* * * * *

UNITED STATES PATENT AND TRADEMARK OFFICE
CERTIFICATE OF CORRECTION

PATENT NO.    : 6,560,050 B2
DATED         : May 6, 2003
INVENTOR(S)   : Carlos Anselmo Casteleiro et al.

It is certified that error appears in the above-identified patent and that said Letters Patent is hereby corrected as shown below:

<u>Column 7,</u>
Line 38, delete "The window of claim 1" and insert therefore -- The window of claim 8 --; and <u>Column 8,</u>
Line 39, delete "The method to form a window of claim 18" and insert therefore -- The method to form a window of claim 15 --.

Signed and Sealed this

Twenty-third Day of September, 2003

JAMES E. ROGAN
*Director of the United States Patent and Trademark Office*